United States Patent [19]

Sala

[11] Patent Number: 4,523,495
[45] Date of Patent: Jun. 18, 1985

[54] DIFFERENTIAL ASSEMBLY FOR DISTRIBUTION OF TORQUE BETWEEN THE FRONT AND REAR AXLES OF AN AUTOMOTIVE VEHICLE

[75] Inventor: Silvio Sala, Milan, Italy

[73] Assignee: S.I.R.P. Studi Industriali Realizzazione Prototipi S.p.A., Moncalieri, Italy

[21] Appl. No.: 480,134

[22] Filed: Mar. 29, 1983

[30] Foreign Application Priority Data

Jun. 11, 1982 [IT] Italy ................ 21821 A/82

[51] Int. Cl.³ .................. F16H 1/42; F16H 37/08
[52] U.S. Cl. .................................. 74/714; 74/695
[58] Field of Search .............. 74/714, 665 GB, 665 T, 74/705, 695

[56] References Cited

U.S. PATENT DOCUMENTS

| 3,400,777 | 9/1968 | Hill ................... 74/665 T X |
| 3,557,634 | 1/1971 | Bixby ................ 74/714 X |
| 3,792,628 | 2/1974 | Stieg ................. 74/714 |
| 3,899,938 | 8/1975 | Crabb ................ 74/714 X |
| 3,976,154 | 8/1976 | Clark et al. ....... 74/714 X |
| 4,431,079 | 2/1984 | Suzuki ............... 74/695 X |

FOREIGN PATENT DOCUMENTS 811650 7/1949 Fed. Rep. of Germany ........ 74/714

Primary Examiner—George H. Krizmanich
Assistant Examiner—Dirk Wright
Attorney, Agent, or Firm—Young & Thompson

[57] ABSTRACT

A third differential structure useful as a transmission component for vehicles with transverse power pack, such as makes it possible to take off power for driving the subsidiary driven axle, with the bulk of the third differential kept to a minimum, and such as also permits an extremely wide-ranging variability of the vertical and horizontal disposition of the power take off. To distribute drive between a first differential of a first axle and a second differential of a second axle, there is provided a crown wheel (10) in driving engagement with a gearbox output wheel (13). Cylindrical spur gears (16, 17) rotatably mounted on the crown wheel mesh with each other and each meshes with one of two coaxial spur wheels (19, 20). One of these spur wheels is connected with the first differential and the second spur wheel is connected with the second differential.

3 Claims, 4 Drawing Figures

DIFFERENTIAL ASSEMBLY FOR DISTRIBUTION OF TORQUE BETWEEN THE FRONT AND REAR AXLES OF AN AUTOMOTIVE VEHICLE

One of the fundamental problems solved by using a "third differential", that is to say a differential which distributes torque between the two axles of a vehicle, is the requirement that the said component have a very small bulk.

It in fact frequently occurs that a model of vehicle designed with a bodywork intended for propulsion with the driven wheels on one axle only may employ a more powerful engine which can with advantage use a four-wheel-drive system.

A like problem arises when a four-wheel-drive system is required for use of the vehicle on terrain where adhesion is poor. In addition to the problem of obtaining a small overall bulk, other closely related problems exist.

For the structure of the differential assembly must permit a satisfactory adaptability of the output of the power take off shaft for the entrainment of the supplementary driven wheels so that the chassis does not have to have alterations made to it, not even to the drive shaft tunnel.

Moreover, an apt choice of the position of this power take off output allows improved transmission, i.e. allows the transmission to be as linear as possible so as to avoid the inconstant velocity phenomena of the universal joints caused by not negligible angles between the rotation axes of the various members linked to the transmission. Finally, an appreciable advantage of this differential is that the distribution of torque between the outputs can be freely selected in advance during the planning stage, so that both the rear axle and the front axle can be appropriately loaded.

To achieve the said purposes the invention embodies a differential assembly for the distribution of drive between a first differential of a first axle in the vicinity of which there is disposed in parallel the engine-gearbox assembly, and the second differential of a second axle, characterized in that it comprises a crown wheel with cylindrical spur gears pivoted thereon to engage with each other and each one with an external toothing of two coaxial spur wheels, one of which is the spur wheel carrier of the first differential, the second coaxially enclosing the first and carrying a further cylindrical crown wheel engaging a wheel solid with a spur gear meshing with another spur gear connected to the propeller shaft relating to the second differential.

The advantages and characteristics of the invention will become more fully apparent from the following description of one practical embodiment thereof, illustrated in the attached drawings, in which:

FIGS. 3 and 4 are overall views, respectively plan and elevational views, of the power pack and of a part of the transmission system of a vehicle to which the device according to the invention is applied.

Figure 1:
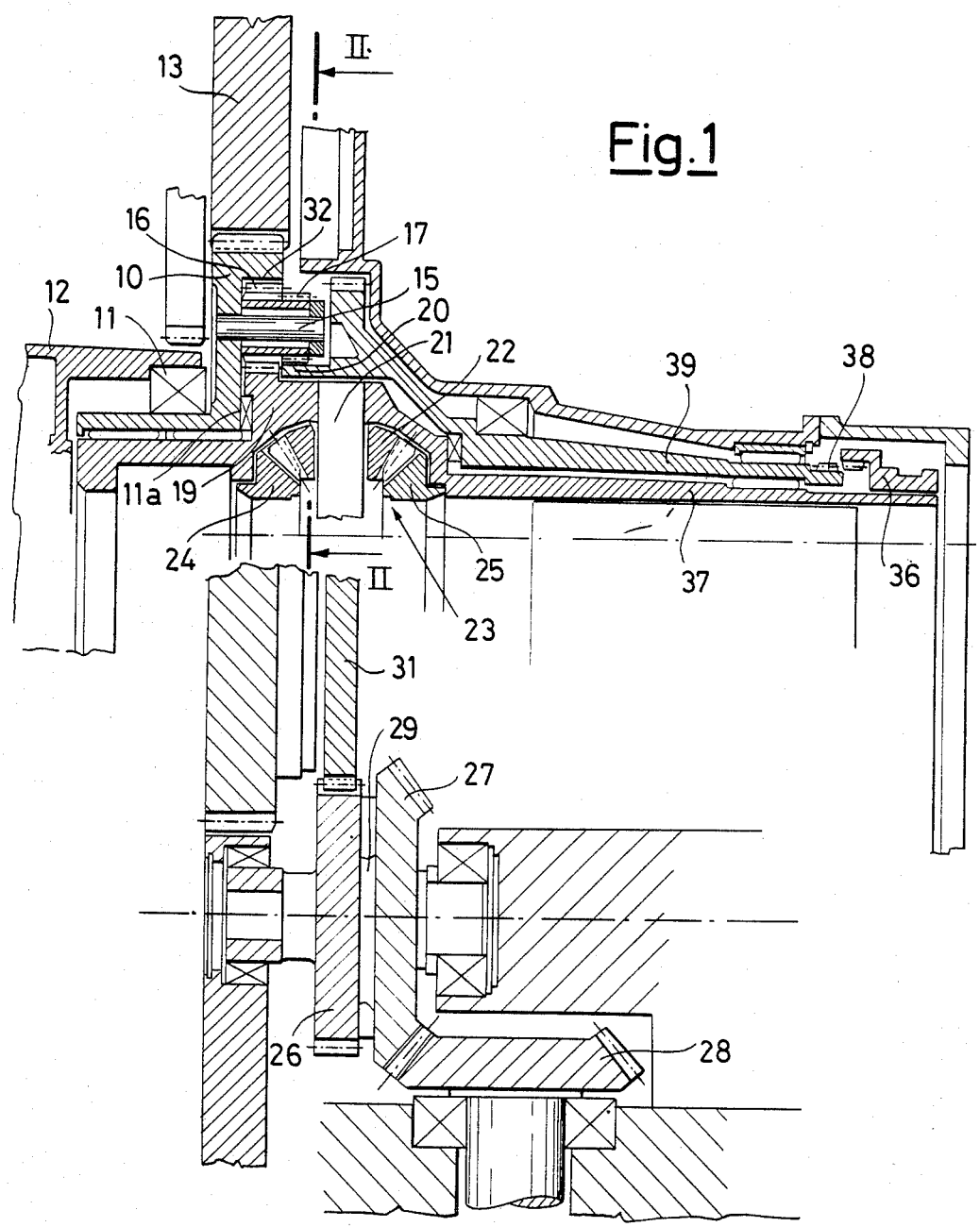
FIG. 1 is a schematic sectional view of the essential components of a differential unit according to the invention.

As shown in the drawings, the differential assembly (FIGS. 1 and 2) comprises a wheel 10 which is supported by bearings 11-11a in the gearbox 12 and which is entrained by meshing with the gearbox output wheel 13, of traditional type.

The wheel 10, mounted idly and coaxially with the front axle, carries the spindles 14 and 15 of spur gears 16 and 17 which engage with each other and respectively with the spur wheels 19 and 20. The spur wheel 19 carries the spindle 21 on which are idly mounted the spur gears 22 of the traditional differential, indicated generically by 23 and comprising the two spur wheels 24 and 25 connected to each of the half-shafts.

Figure 3:
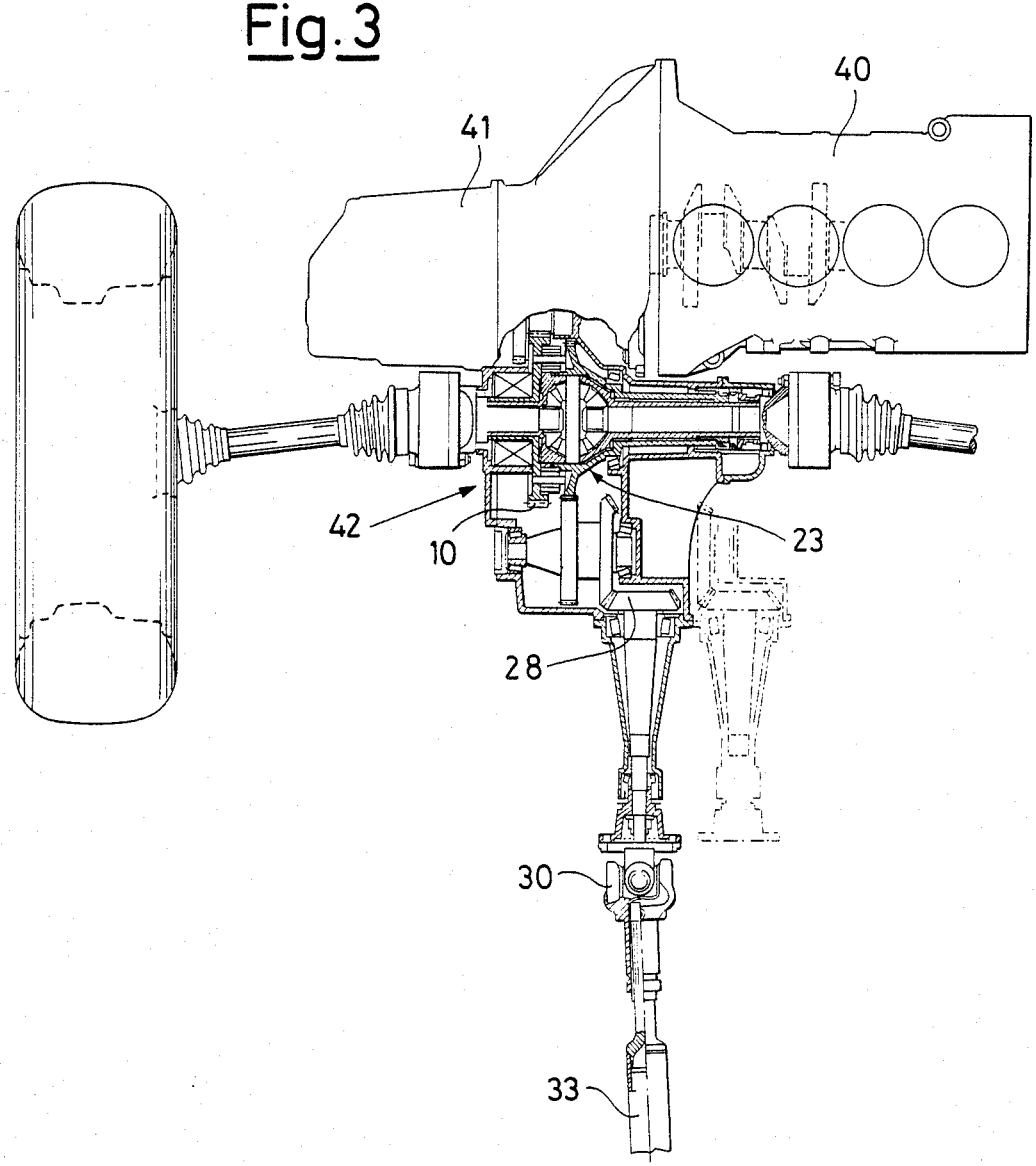

The other spur wheel 20 carries another toothed crown wheel 31 which meshes with the wheel 26 to which there is rigidly connected on a shaft 29 the spur gear 27 which is in mesh with the spur gear 28 from which is drawn the drive which with a normal universal joint 30 and a driven shaft 33 (FIG. 3) is transmitted to the differential—not shown—of the rear axle.

Figure 2:
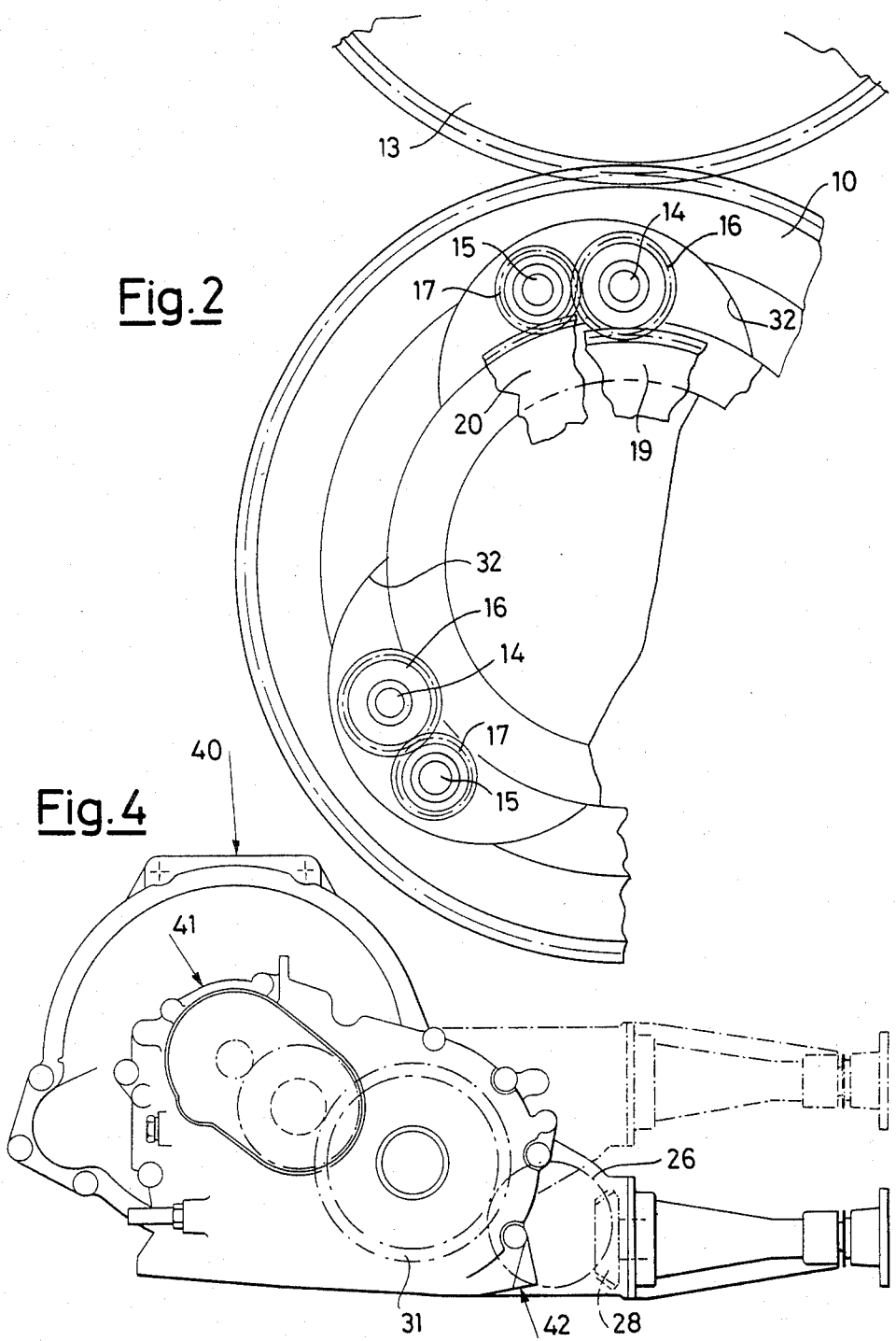
FIG. 2 is a partial sectional view in the direction of the line II—II of FIG. 1.

The third differential according to the invention thus consists of the wheel 10, the function of which is to carry the spur gears 16 and 17 in one of its seatings 32, better illustrated in FIG. 2, and of the two externally toothed spur wheels 19 and 20 which are disposed around the differential 23 of the front axle, thus minimizing the greater longitudinal bulk due to the addition of this unit.

There also needs to be noted the output from the differential of the power take off through the cylindrical toothed crown wheel 31 of the spur wheel 20, which engages the wheel 26, only subsequently to be transmitted through the final drive 27-28.

A structural arrangement of this kind makes it possible to obviate the greater longitudinal bulk necessarily brought about by the crown wheel 31 of conical configuration, in order to draw directly therefrom the drive to a head pinion of the driven shaft.

With this original layout of the components there is obtained the advantage of being able variously to arrange the differential output with minimal constructional alterations.

For, by varying the length of the shaft 29, the output from the spur gear 28 can be shifted in the horizontal plane so as to place the propeller shaft to the rear wheels in the optimal position. Such a possibility is better illustrated in FIG. 3, which gives a schematic overall plan view of the mechanical components of a vehicle with front tranverse engine, with the gearbox 41, and the differential assembly 42 which incorporates the third differential and the front axle differential, as illustrated in greater detail in the previous figures. There are shown different positions that can be taken up by the gear 28 and thus by the shaft 33 coming out of it, as a result of providing different lengths for the shaft 29.

The vertical distance of the output of the power take off can be readily varied simply by orbiting the shaft of the pinion 28 about the axis of the spur wheel 20. The different vertical positions shown in the lateral view of the assembly as per FIG. 4 can in this manner be achieved.

The advantage deriving from the existence of the pair of spur wheels 19-20 in this specific application is the possibility of lining-up the distribution of torque in a different manner in the third differential.

In effect, by appropriately sizing the pair 19-20, the distribution of torque in the third differential can be varied by reason of the different diameter assumed by the two spur wheels 19 and 20. The desired distribution of torque between the front and rear axles of the vehicle can thus be obtained.

The differential assembly as illustrated can of course be completed with all the further traditional components required for the functioning that is desired. Thus, the third differential can be locked by a coupling between the two spur wheels; an example of such coupling is provided by the sliding sleeve 36 on the tubular extension 37 of the spur wheel 19, which sleeve can engage at the toothed position 38 which terminates the tubular extension 39 of the spur wheel 20.

I claim:

1. A differential assembly for the distribution of drive between a first differential of a first axle and a second differential of a second axle, comprising a crown wheel (10) in driving engagement with a gearbox output wheel (13), cylindrical spur gears (16, 17) rotatably mounted on said crown wheel, said spur gears meshing with each other and each meshing with one of two coaxial spur wheels (19, 20), one of said spur wheels being connected with the first differential and the second spur wheel being connected with the second differential.

2. A differential assembly for the distribution of drive according to claim 1, wherein said spur wheels (19, 20) are positioned around the differential (23) of the front axle, the spur wheel (20) connected with the second differential enclosing the spur wheel (19) connected with the first differential.

3. A differential assembly for the distribution of drive according to claim 1, wherein the spur wheel (20) connected with the second differential carries a toothed crown wheel (31) which meshes with a wheel (26) fixed to a bevel gear (27) meshing with another bevel gear (28) connected with the second differential.

* * * * *